US012639339B2

(12) United States Patent
Yarlagadda et al.

(10) Patent No.: US 12,639,339 B2
(45) Date of Patent: May 26, 2026

(54) SYSTEMS AND METHODS FOR DATA VISUALIZATION IN THE META VERSE WITH PORTABILITY TO MULTIPLE META VERSE CHANNELS

(71) Applicant: JPMORGAN CHASE BANK, N.A., New York, NY (US)

(72) Inventors: Sitaram Yarlagadda, Plano, TX (US); Ananth Hegde, Frisco, TX (US); Ritu Sharma, London (GB); Priyanka Kewalramani, New York, NY (US); Virinchi Ramakrishna Racherla, Highland Village, TX (US); Pranay Boppana, Glasgow (GB); Allison Edwards, Fulshear, TX (US); Nicole Hui, Sunnyvale, TX (US); Jay Gupta, Plano, TX (US); Samuel Stegall, Houston, TX (US); Xiaoyue Liu, The Colony, TX (US); Annabel To, Glasgow (GB); Kwanwoo Kim, Chicago, IL (US); Richard Paredes, Aylesford (GB); Manoj Ganapathy, Plano, TX (US); Venu Macha, Thonotosassa, FL (US); Phillips Hunter Cummin, San Francisco, CA (US); Marigrace Seaton, Los Angeles, CA (US); Joseph Lawler, Spicewood, TX (US); Rod Ta, Manhattan, NY (US); George Arias, Jersey City, NJ (US); Vaibhav Sriram, Plano, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/354,214

(22) Filed: Jul. 18, 2023

(65) Prior Publication Data
US 2025/0028739 A1     Jan. 23, 2025

(51) Int. Cl.
*G06F 16/28*          (2019.01)
(52) U.S. Cl.
CPC .................................. *G06F 16/287* (2019.01)
(58) Field of Classification Search
None
See application file for complete search history.

(56) References Cited

U.S. PATENT DOCUMENTS

| | | | |
|---|---|---|---|
| 11,561,579 B2 * | 1/2023 | Berliner | ................ G06F 3/0489 |
| 2018/0144396 A1 * | 5/2018 | Yin | ........................ G06Q 50/01 |

(Continued)

*Primary Examiner* — Taelor Kim
(74) *Attorney, Agent, or Firm* — GREENBERG TRAURIG LLP

(57) ABSTRACT

Systems and methods for data visualization in the metaverse with portability to multiple metaverse channels are disclosed. In one embodiment, a method for data visualization in the metaverse with portability to multiple metaverse channels may include: (1) ingesting, by a data rendering computer program, data from a plurality of data sources, each data source associated with an entity; (2) categorizing, by the data rendering computer program, the ingested data into a plurality of categories, wherein each category of data comprises data from a subset of two or more of the plurality of the data sources; and (3) streaming, by the data rendering computer program, one of the categories of data to an immersive input/output device associated with a user over one of a plurality of metaverse channels, wherein the category of data is consumed by the immersive input/output device.

3 Claims, 3 Drawing Sheets

(56)             References Cited

U.S. PATENT DOCUMENTS

| | | | |
|---|---|---|---|
| 2019/0146838 A1* | 5/2019 | Zott | G06F 3/067 |
| | | | 718/104 |
| 2020/0043243 A1* | 2/2020 | Bhushan | G06F 1/1686 |
| 2022/0398730 A1* | 12/2022 | Neumann | G06T 7/0012 |
| 2023/0368258 A1* | 11/2023 | Kim | G06Q 30/0613 |

* cited by examiner

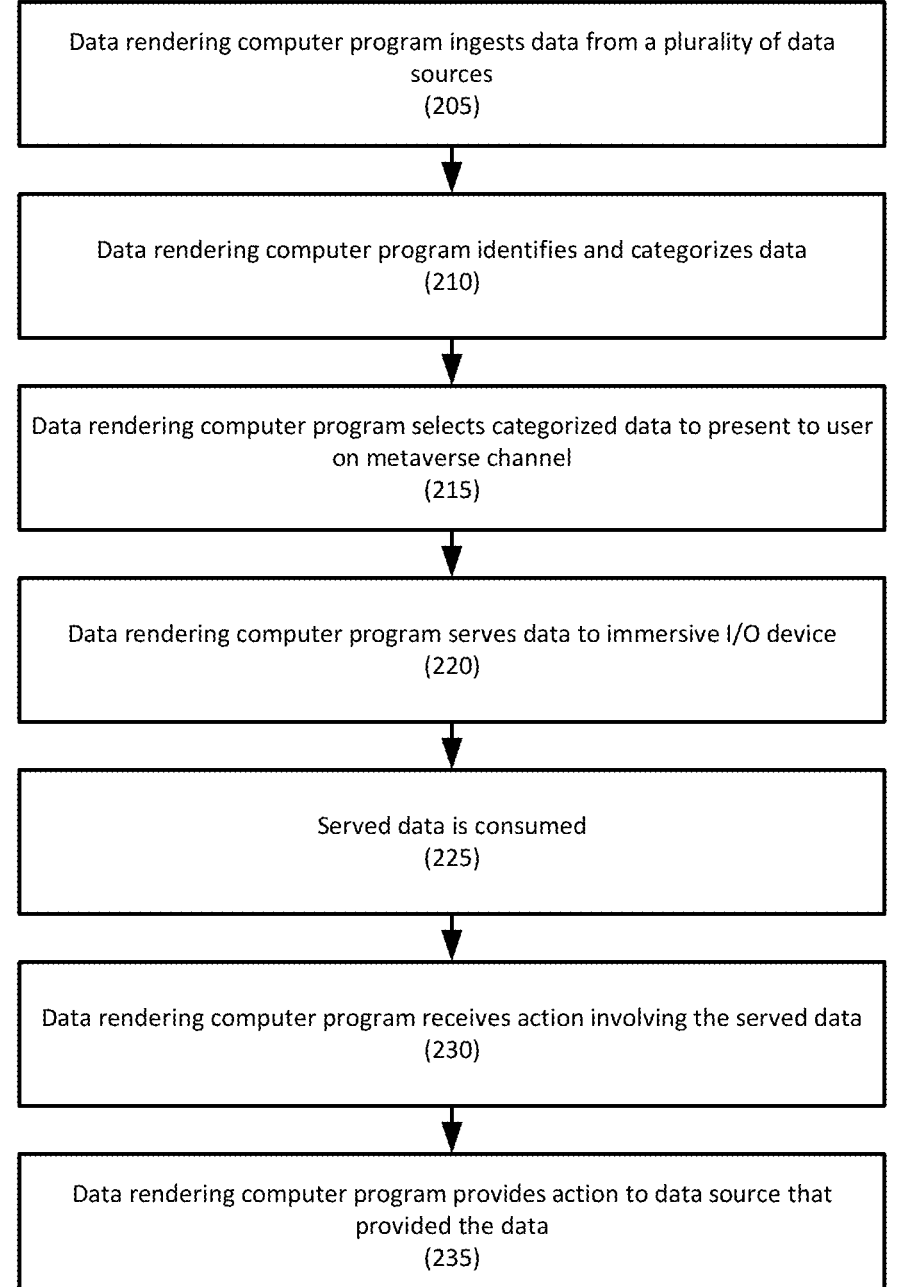

Data rendering computer program ingests data from a plurality of data sources
(205)

Data rendering computer program identifies and categorizes data
(210)

Data rendering computer program selects categorized data to present to user on metaverse channel
(215)

Data rendering computer program serves data to immersive I/O device
(220)

Served data is consumed
(225)

Data rendering computer program receives action involving the served data
(230)

Data rendering computer program provides action to data source that provided the data
(235)

FIGURE 2

SYSTEMS AND METHODS FOR DATA VISUALIZATION IN THE META VERSE WITH PORTABILITY TO MULTIPLE META VERSE CHANNELS

BACKGROUND OF THE INVENTION

1. Field of the Invention

Embodiments generally relate to systems and methods for data visualization in the metaverse with portability to multiple metaverse channels.

2. Description of the Related Art

The metaverse is a new technology concept allows users to interact with a virtual world. Users can shop, work, and interact with other virtual users. The future of the Metaverse appears to be limitless.

SUMMARY OF THE INVENTION

Systems and methods for data visualization in the metaverse with portability to multiple metaverse channels are disclosed. In one embodiment, a method for data visualization in the metaverse with portability to multiple metaverse channels may include: (1) ingesting, by a data rendering computer program, data from a plurality of data sources, each data source associated with an entity; (2) categorizing, by the data rendering computer program, the ingested data into a plurality of categories, wherein each category of data comprises data from a subset of two or more of the plurality of the data sources; and (3) streaming, by the data rendering computer program, one of the categories of data to an immersive input/output device associated with a user over one of a plurality of metaverse channels, wherein the category of data is consumed by the immersive input/output device.

In one embodiment, each data source may be further associated with one of the plurality of metaverse channels.

In one embodiment, the ingested data may be categorized based on a relevance to the user. The relevance may be based on the user having an account with the entity providing the ingested data.

In one embodiment, the plurality of metaverse channels may include storefronts.

In one embodiment, the plurality of metaverse channels may include metaverse locations.

In one embodiment, the method may also include: receiving, by the data rendering computer program, an action involving certain data in the category of data; and providing, by the data rendering computer program, the action to the data source that provided the certain data.

According to another embodiment, a system may include: a plurality of data sources, each data source associated with an entity; an immersive input/output device associated with a user at one of a plurality of metaverse channels; and a data rendering computer program executed by a backend electronic device that ingests data from the plurality of data sources, categorizes the ingested data into a plurality of categories, wherein each category of data comprises data from a subset of two or more of the plurality of the data sources, and streams one of the categories of data to the immersive input/output device over the metaverse channel, wherein the category of data is consumed by the immersive input/output device.

In one embodiment, each data source may be further associated with one of the plurality of metaverse channels.

In one embodiment, the ingested data may be categorized based on a relevance to the user. The relevance may be based on the user having an account with the entity providing the ingested data.

In one embodiment, the plurality of metaverse channels may include storefronts.

In one embodiment, the plurality of metaverse channels may include metaverse locations.

In one embodiment, the data rendering computer program receives an action involving certain data in the category of data and provides the action to the data source that provided the certain data.

According to another embodiment, a non-transitory computer readable storage medium may include instructions stored thereon, which when read and executed by one or more computer processors, cause the one or more computer processors to perform steps comprising: ingesting data from a plurality of data sources, each data source associated with an entity and with one of a plurality of metaverse channels; categorizing the ingested data into a plurality of categories, wherein each category of data comprises data from a subset of two or more of the plurality of the data sources; and streaming one of the categories of data to an immersive input/output device associated with a user over one of the plurality of metaverse channels, wherein the category of data is consumed by the immersive input/output device.

In one embodiment, the ingested data may be categorized based on a relevance to a user. The relevance may be based on the user having an account with the entity providing the ingested data.

In one embodiment, the plurality of metaverse channels may include storefronts.

In one embodiment, the plurality of metaverse channels may include metaverse locations.

In one embodiment, the non-transitory computer readable storage medium may also include instructions stored thereon, which when read and executed by one or more computer processors, cause the one or more computer processors to perform steps comprising: receiving an action involving certain data in the category of data; and providing the action to the data source that provided the certain data.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

FIG. 2 depicts a method for data visualization in the metaverse with portability to multiple metaverse channels according to one embodiment.

DETAILED DESCRIPTION OF PREFERRED EMBODIMENTS

Embodiments are directed to systems and methods for data visualization in the metaverse with portability to multiple metaverse channels.

Embodiments may include a micro front end and a micro service architecture solution that can be ported on Web 3.0, Web 2.0, Mobile and XR channels for data visualization. Embodiments may be agnostic to the data provided; thus embodiments may be used with any data product.

Embodiments may provide some or all of the following: immersive web and voice interactivity, the delivery of consistent and qualitative results, portability for Web 3.0, Web 2.0, mobile and XR channels, etc.

Figure 1:
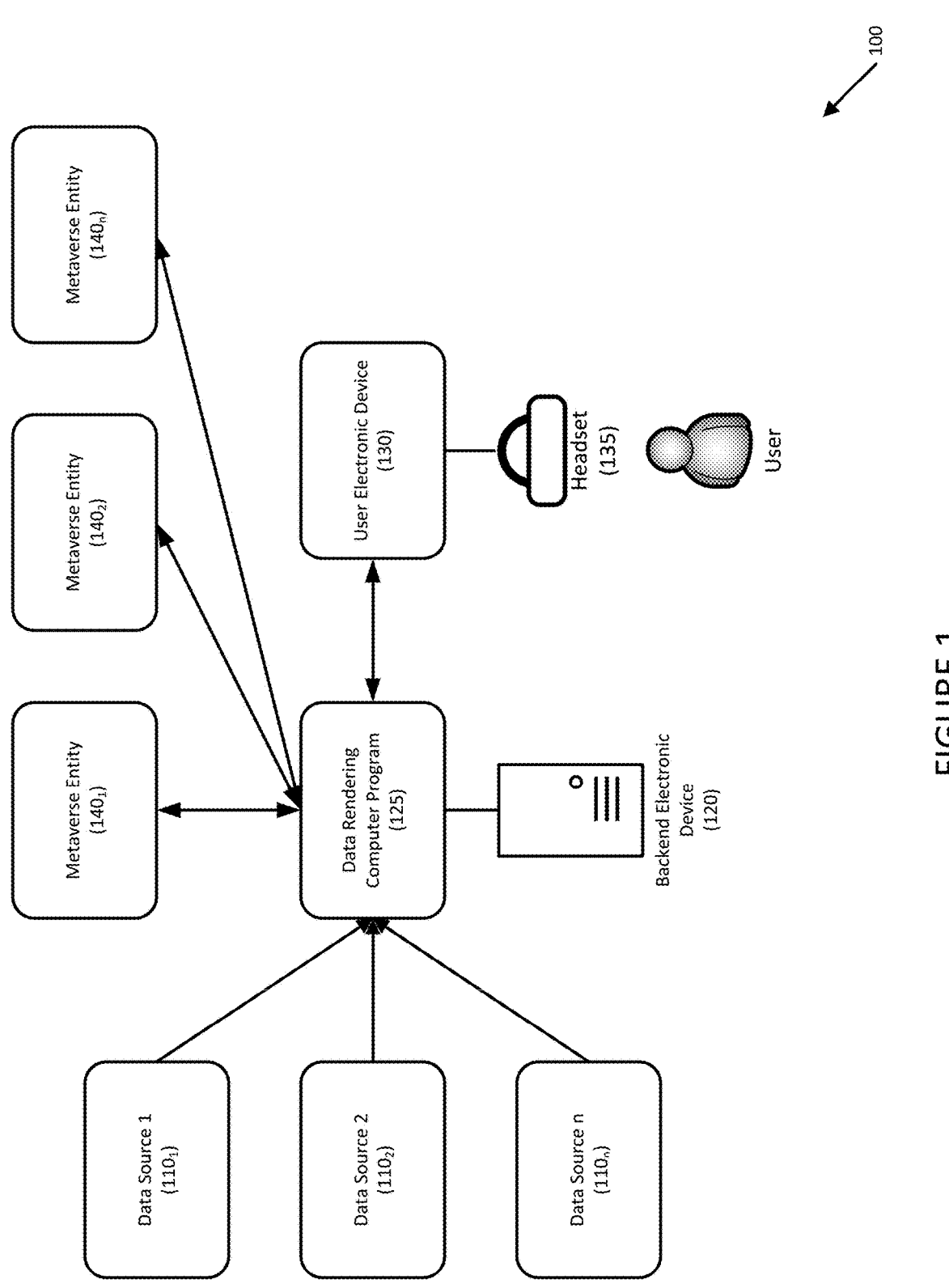
FIG. 1 depicts a system for data visualization in the metaverse with portability to multiple metaverse channels according to an embodiment.

Referring to FIG. 1, a system for data visualization in the metaverse with portability to multiple metaverse channels is disclosed according to an embodiment. For example, different entities may have different metaverse channels. Thus, embodiments may present the data visualizations across any or all of these different metaverse channels.

Examples of metaverse channels include storefronts, metaverse locations, etc.

System 100 may include a plurality of data sources 110 (e.g., 110₁, 110₂, . . . 110ₙ). Data sources 110 may provide streaming data to data rendering computer program 125. Examples of types of streaming data may include structured, semi-structured, or unstructured data that may be received as batch, in near real-time, or in real-time.

System 100 may further include metaverse entities 140 (e.g., metaverse entity 140₁, metaverse entity 140₂, . . . metaverse entity 140ₙ. Each metaverse entity 140 may provide a metaverse channel. Each metaverse entity 140 may include blockchain-based systems, cloud systems, on-premises systems, etc.

Data rendering computer program 125 may be executed by backend electronic device 120, which may be a server (e.g., physical and or cloud-based), computers (e.g., workstations, desktops, laptops, notebooks, tablets, etc.), smart devices (e.g., smart phones, smart watches, etc.), Internet of Things (IoT) appliances, etc. Data rendering computer program 125 may ingest data from data sources 110 and may transform the data for visualization in an immersive environment, such as the metaverse/Web 3.0. Data rendering computer program 125 may provide the visualization in, for example, a stream, to user electronic device 130, which may be a computer, a smart device, an IoT appliance, etc. User electronic device 130 may interface with, or may include headset 135, which may display the visualization to the user in the immersive environment.

Although FIG. 1 depicts one user electronic device 130 and one headset 135, it should be recognized that multiple electronic devices 130 and headsets 135 may be provide and multiple users may receive the same or similar visualizations. In one embodiment, multiple users may interact with the visualization in the immersive environment.

Referring to FIG. 2, a method for data visualization in the metaverse with portability to multiple metaverse channels is disclosed according to an embodiment In step 205, a data rendering computer program may ingest data from a plurality of data sources. For example, the data sources may provide streaming data.

In one embodiment, each data source may be associated with a different entity, such as a business. Each entity may provide its own metaverse channel, such as a storefront, location, etc.

In step 210, the data rendering computer program may identify and categorize the data. For example, the data rendering computer program may determine what streaming data is relevant to the user.

In one embodiment, the data rendering computer program may categorize the data based on whether the user has an account with the entity providing the streaming data.

In one embodiment, the categories may include data from a subset of two or more of the data source, i.e., from two or more entities.

In step 215, the data rendering computer program may combine the categorized data into a feed to a metaverse channel. For example, the data rendering computer program may select a category of relevant data to stream to a user over a metaverse channel.

In step 220, the data rendering computer program may serve data to an immersive I/O device, such as a headset. The data rendering computer program may serve the data across multiple metaverse channels.

In step 225, the served data may be consumed. For example, the user may take one or more actions to capture the data.

In step 230, the data rendering computer program may receive an action involving the served data, and in step 235, the data rendering computer program may provide the action to the data source that provided the data.

Figure 3:
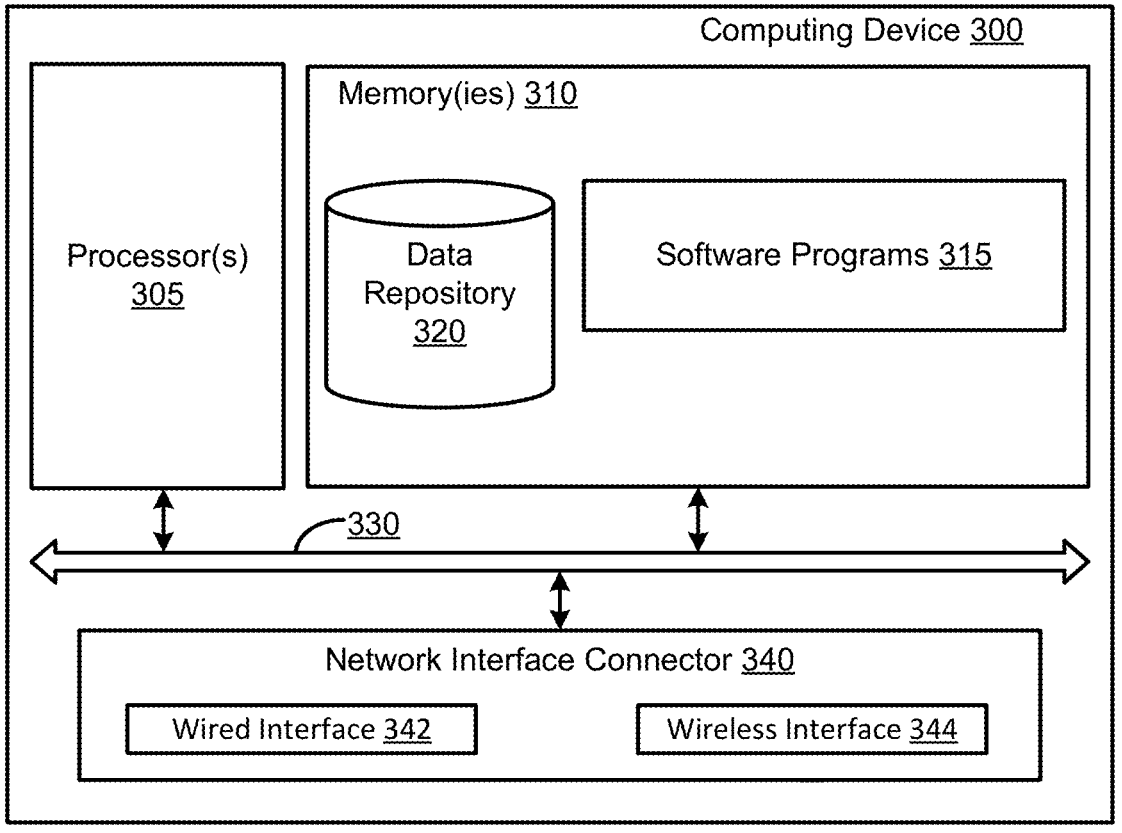
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example.

Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for data visualization in a metaverse with portability to multiple metaverse channels, comprising:

ingesting, by a data rendering computer program, data from a plurality of data sources as a batch in real-time, each data source provided by an entity;

categorizing, by the data rendering computer program, the ingested data into a plurality of categories, wherein each category of data comprises data from a subset of two or more of the plurality of the data sources;

identifying a category that is relevant to a user of the data rendering computer program, wherein relevance is determined based on whether the user has an account with the entity providing the data source;

streaming, by the data rendering computer program, the category of data identified as relevant to the user of the data rendering computer program to an immersive input/output device associated with a user over one of a plurality of metaverse channels, wherein the category of data is consumed by the immersive input/output device; wherein each metaverse channel is associated with a virtual storefront and comprises a metaverse location, wherein the one category of data identified as relevant to the user of the data rendering computer program is combined with another category of the plurality of categories by the data rendering computer program into a feed;

receiving, by the data rendering computer program, an action involving certain data in the category of data, wherein the action is generated by the user via the immersive input/output device in the metaverse channel;

providing, by the data rendering computer program, the action to one of the plurality of data sources that provided the certain data via the corresponding metaverse channel;

serves, by the data rendering computer program, the category of data across the plurality of metaverse channels, wherein the serving comprises synchronizing the category of data among Web 3.0, Web 2.0, Mobile, and extended reality (XR) channels; and ports, on the Web 3.0, the Web 2.0, the Mobile, or the extended reality (XR) channels to the immersive input/output device, a data visualization of the ingested data, wherein the data visualization is ported in a format compatible with each of the plurality of metaverse channel.

2. A system, comprising:

a plurality of data sources, each data source associated with an entity;

an immersive input/output device associated with a user at one of a plurality of metaverse channels; and a data rendering computer program executed by a backend electronic device that:

ingests data from the plurality of data sources as a batch in real-time, categorizes the ingested data into a plurality of categories, wherein each category of data comprises data from a subset of two or more of the plurality of the data sources, identifies a category of the plurality of categories that is relevant to a user of the data rendering computer program, wherein relevance is determined based on whether the user has an account with the entity providing the data source, streams the category of data that is relevant to the user of the data rendering computer program to the immersive input/output device over one of the plurality of metaverse channels, wherein the category of data is consumed by the immersive input/output device; wherein each metaverse channel is associated with a virtual storefront and comprises a metaverse location, wherein the category of data identified as relevant to the user of the data rendering computer program is combined with another category of the plurality of categories by the data rendering computer program into a feed;

receives, by the data rendering computer program, an action involving certain data in the category of data, wherein the action is generated by the user via the immersive input/output device in the metaverse channel;

provides, by the data rendering computer program, the action to one of the plurality of data sources that provided the certain data via the corresponding metaverse channel;

serves, by the data rendering computer program, the category of data across the plurality of metaverse channels, wherein the serving comprises synchronizing the category of data among Web 3.0, Web 2.0, Mobile, and extended reality (XR) channels; and ports, on the Web 3.0, the Web 2.0, the Mobile, or the extended reality (XR) channels to the immersive input/output device, a data visualization of the ingested data, wherein the data visualization is ported in a format compatible with each of the plurality of metaverse channel.

3. A non-transitory computer readable storage medium, including instructions stored thereon, which when read and executed by one or more computer processors, cause the one or more computer processors to perform steps comprising:

ingesting data from a plurality of data sources as a batch in real-time, each data source associated with an entity and with one of a plurality of metaverse channels;

categorizing the ingested data into a plurality of categories, wherein each category of data comprises data from a subset of two or more of the plurality of data sources;

identifying the category that is relevant to a user of the data rendering computer program, wherein relevance is determined based on whether the user has an account with the entity providing the data source;

streaming a category of data identified as relevant to the user of the data rendering computer program to an immersive input/output device associated with a user over one of the plurality of metaverse channels, wherein the category of data is consumed by the immersive input/output device; wherein each metaverse channel is associated with a virtual storefront and comprises a metaverse location, wherein the category of data identified as relevant to the user of the data rendering computer program is combined with another category of the plurality of categories by the data rendering computer program into a feed;

receives-an action involving certain data in the category of data, wherein the action is generated by the user via the immersive input/output device in the metaverse channel;

provides the action to one of the plurality of data sources that provided the certain data via the corresponding metaverse channel;

serves category of data across the plurality of metaverse channels, wherein the serving comprises synchronizing the category of data among Web 3.0, Web 2.0, Mobile, and extended reality (XR) channels; and ports, on the Web 3.0, the Web 2.0, the Mobile, or the extended reality (XR) channels to the immersive input/ output device, a data visualization of the ingested data, wherein the data visualization is ported in a format compatible with each of the plurality of metaverse channel.

* * * * *